July 22, 1958   H. E. BARROWS ET AL   2,844,176
MACHINE FOR JUICING, SLICING AND SHREDDING FOOD MATERIALS
Filed Sept. 5, 1956   3 Sheets-Sheet 3
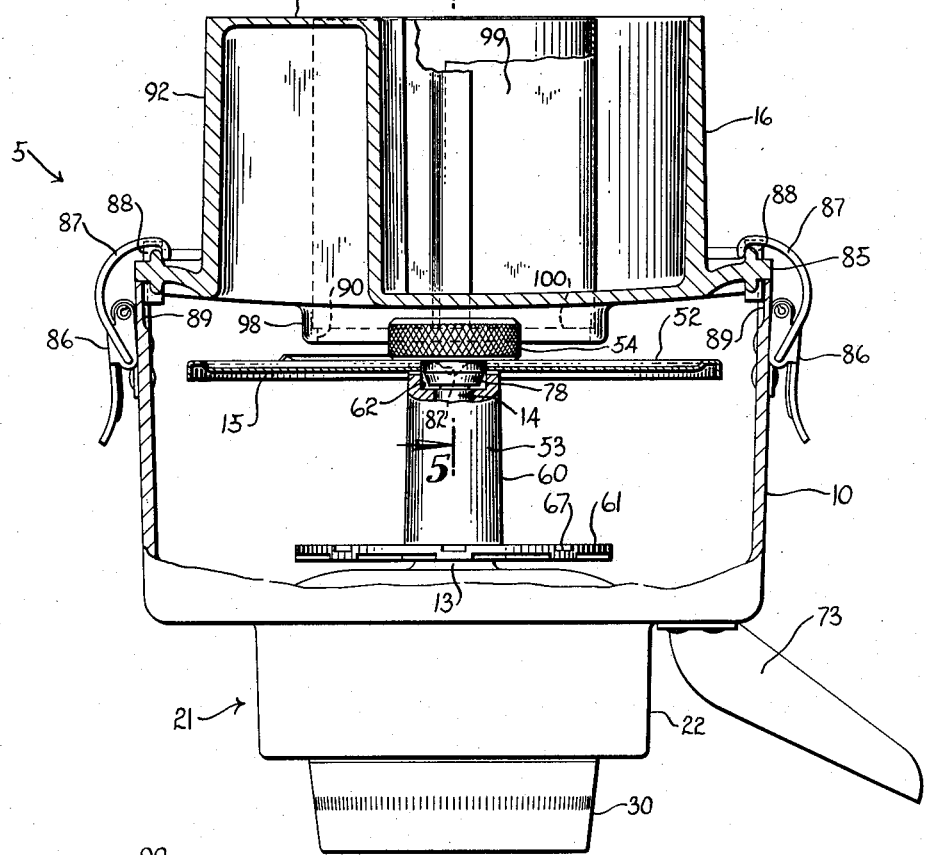
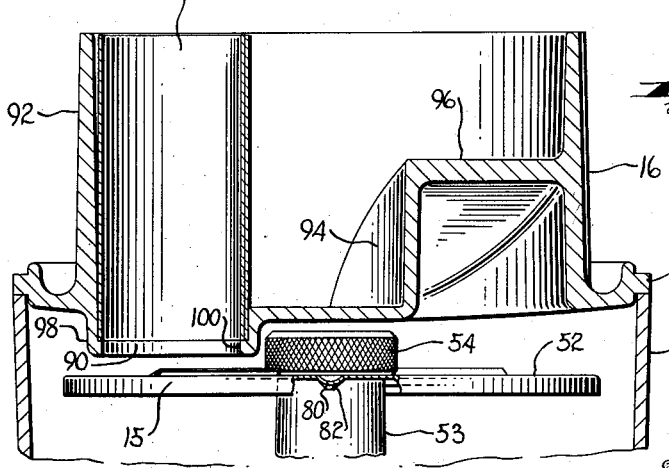
Inventors
Howard E. Barrows
William P. Luther
By Ira Milton Jones
Attorney United States Patent Office 2,844,176
Patented July 22, 1958

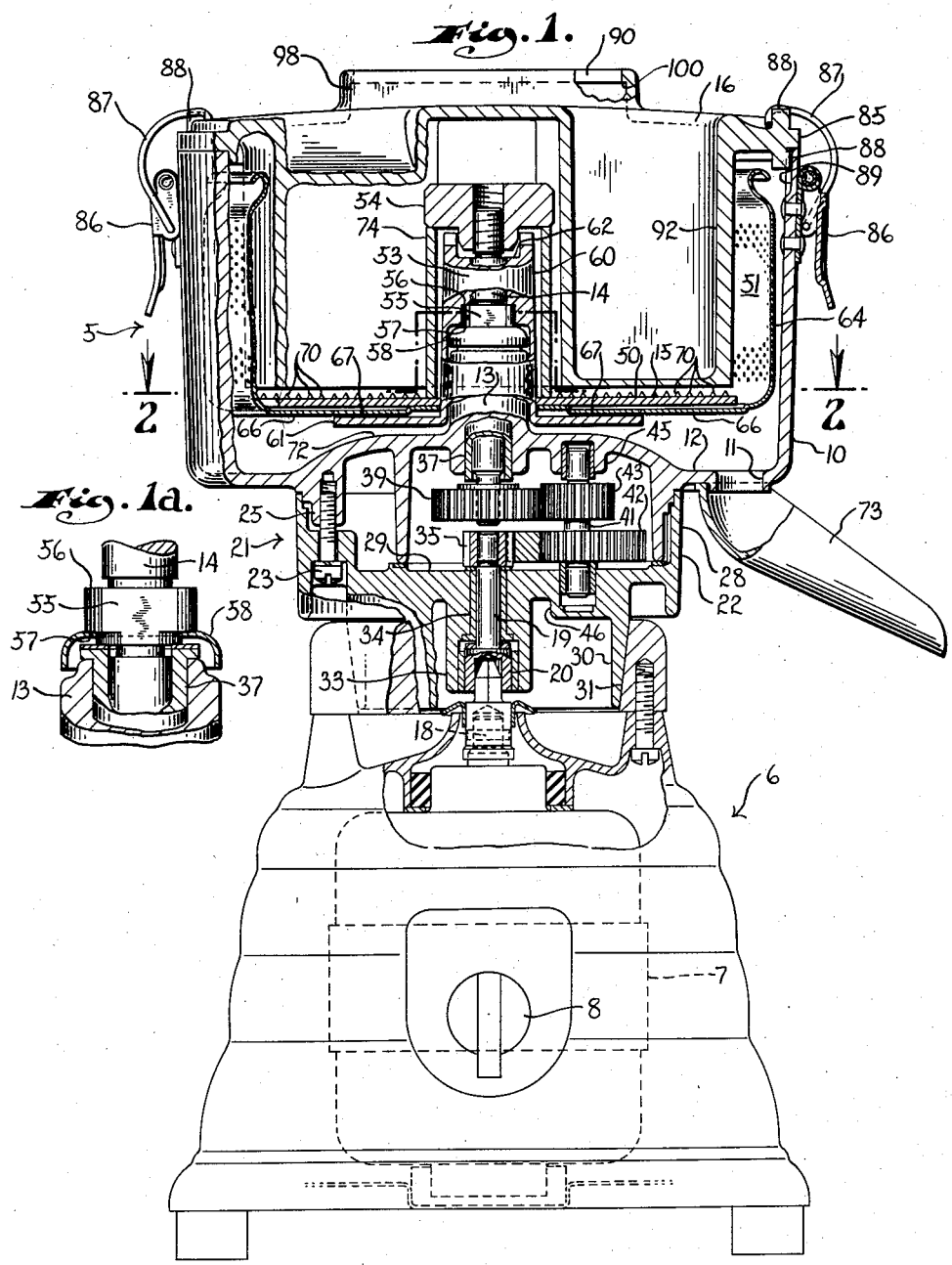

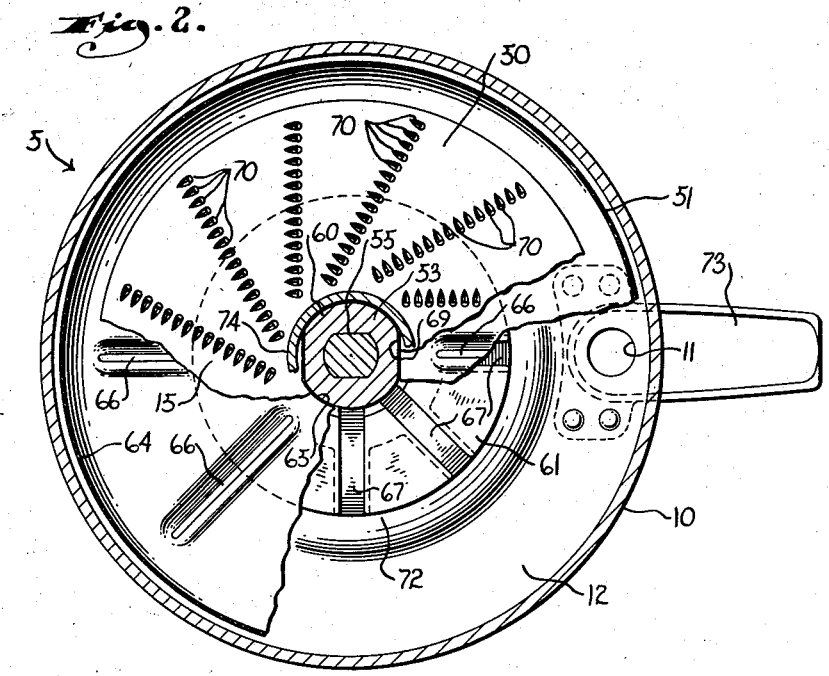

2,844,176

MACHINE FOR JUICING, SLICING, AND SHREDDING FOOD MATERIALS

Howard E. Barrows and William P. Luther, Racine, Wis., assignors to John Oster Manufacturing Co., Milwaukee, Wis., a corporation of Wisconsin Application September 5, 1956, Serial No. 608,155

7 Claims. (Cl. 146—3)

This invention relates to apparatus for macerating and cutting food materials, and refers more particularly to an appliance adapted for either shredding or slicing food materials or for macerating or comminuting such materials and extracting juices therefrom.

The present invention has for its object the provision of an unusually versatile appliance of the character described, wherein food materials can be treated in any of a variety of ways, at the option of the operator, as for example, by slicing, shredding or macerating.

Another object of this invention resides in the provision of an appliance of the character described which is in the nature of an attachment adapted for use in conjunction with the power base of another appliance, such as a food comminuting machine of the type having a detachable mixing vessel, so that the apparatus of this invention is not only versatile in itself but increases the utility and versatility of the device having the power base which it shares.

Still another object of this invention, related to the object last stated, is to provide an appliance of the character described comprising a bowl having a rotatable operating or cutter shaft projecting upwardly thereinto on an axis coinciding with that of the bowl, and having a drive shaft accessible at the underside of the bowl to be drivingly connectable with an electric motor or the like, wherein said cutter shaft and the drive shaft are coaxially disposed despite the fact that the cutter shaft is coupled to the drive shaft to run at a substantially lower speed than the drive shaft, thereby assuring that the unit will always be well balanced and smooth running.

A further object of this invention resides in the provision of an appliance of the character described comprising a bowl having an outlet at one side of its bottom wall and in which a foraminous basket may be readily removably mounted on a rotatably driven shaft projecting upwardly from the center of the bowl, which shaft also removably carries a macerating element in the bottom portion of the basket so that pieces of food material disintegrated thereby will be centrifuged by the foraminous basket to have juices expelled therefrom and discharged through the outlet in the bowl.

It is also an object of this invention to provide, in a machine of the character described, means for detachably mounting a cutting disc on said cutter shaft at a level substantially above that of the bottom of the bowl into which the shaft projects, and by which disc large pieces of food material presented thereto may be shredded or sliced.

In this connection it is another object of this invention to provide a machine of the character described, comprising a bowl having a rotatable operating shaft projecting upwardly from the center thereof, upon which shaft either a macerating element and centrifuging basket or a cutting element may be readily removably mounted, which machine features easily cleaned means for carrying the macerating element and centrifuging basket at a low level in the bowl, permitting a substantial volume of pulp to accumulate in the basket as juice is extracted therefrom, or for alternatively carrying the cutting element at a substantially high level in the bowl so that a relatively large volume of sliced or shredded food material may accumulate in the bowl beneath the cutting element.

It is still another object of this invention to provide, in a machine of the type comprising a bowl in which various working elements may be rotatably and readily removably mounted, an invertible cover for the bowl, adapted to be installed thereon in either of two positions, in one of which positions the cover is adapted for cooperation with a macerating element to provide a feed throat whereby food pieces are wedgingly confined against the macerating element to be disintegrated thereby, and in the other of which positions the cover provides a guide by which food pieces may be presented to a slicer or shredder element and held against rotation while being sliced or shredded by such element.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein-disclosed invention may be made as come within the scope of the claims.

The accompanying drawings illustrate one complete example of the physical embodiment of the invention constructed according to the best mode so far devised for the practical application of the principles thereof, and in which:

Figure 1 is a vertical sectional view of the appliance of this invention mounted on a power base and set up for macerating food materials to extract juice therefrom.

Figure 1a is an enlarged fragmentary sectional view of the operating shaft;

Figure 2 is a cross-sectional view taken on the plane of the line 2—2 in Figure 1;

Figure 3 is a perspective view of the removable cover for the appliance of this invention, shown inverted, and with a portion thereof broken away;

Figure 4 is a vertical sectional view of the attachment set up for slicing or shredding food materials; and Figure 5 is a vertical sectional view taken on the plane of the line 5—5 in Figure 4.

Referring now to the accompanying drawings, in which like numerals designate like parts throughout the several views, the numeral 5 designates generally the appliance of this invention, which is preferably in the nature of an attachment adapted to be mounted on a power base 6 of the type used for a food comminuting machine and illustrated, for example, in the patent to William P. Luther, No. 2,733,396, issued January 31, 1956. The machine of this invention, when mounted on such a base, takes the place of the mixing vessel ordinarily used therewith, and is driven by means of the motor 7 conventionally housed in the base and controlled by a suitable electric switch 8 thereon.

The machine or appliance itself comprises a bowl or vessel 10 having a substantially cylindrical side wall and an outlet 11 in its bottom 12 near the side wall. A coaxial boss 13 projects upwardly from the bottom of the bowl and has a bore to rotatably journal an operating shaft 14 which carries the work performing elements 15 of the machine. A cover 16, which may be readily removably mounted on the bowl in either of two positions (as described hereinafter), cooperates with the work performing elements in macerating, shredding or slicing food materials fed into the machine, the type of operation being selectable at the option of the operator.

Accessible at the top of the base 6 is a power shaft 18, the upper end of which is non-circular, and which comprises an extension of the shaft of the motor 7. An upright drive shaft 19 on the bottom portion of the machine has an enlarged bottom portion 20 providing a non-circular downwardly opening socket in which the power shaft 18 is engageable to effect a readily disconnectable driving connection between the power shaft and the drive shaft.

Since food comminuting machines ordinarily operate at higher speeds than would be desirable for an appliance of the type here under consideration, means is provided on the appliance for effecting speed reduction between the drive shaft 19 thereof and its operating shaft 14 which carries the working elements. To this end the lower portion of the appliance comprises a gear housing 21 directly beneath the bottom of the bowl. The top of the gear housing is formed by the bottom of the bowl, and a cup-like cap 22 encloses the gears. The cap is secured at its rim to the bottom of the bowl as by means of screws 23 engaged in bosses 25 projecting downwardly from the bottom of the bowl. The cap provides a substantially cylindrical side wall 28 and a bottom 29 for the gear housing, and also embodies an axially projecting flange 30 extending coaxially downwardly from the bottom of the cap and having its outer surface tapering downwardly to engage in a mating upwardly opening well 31 in the top of the power base to mount the appliance thereon.

Projecting downwardly from the bottom 29 of the cap is a vertically bored boss 33 provided with a suitable bushing 34 in which the drive shaft 19 is journaled. The bottom of the drive shaft may be flush with the bottom of the boss 33, as shown, since the power shaft 18 on the base projects upwardly into the socket in the drive shaft. At its upper end the drive shaft projects into the interior of the gear housing a sufficient distance to have a drive pinion 35 nonrotatably secured thereto. The socket forming bottom portion of the drive shaft cooperates with the drive pinion to preclude axial displacement of the drive shaft in the boss 33, so that the drive shaft is wholly carried by the cup-like cap 22 at all times.

The shaft 14 which carries the working elements is journaled in a suitable bushing 37 in the bored boss 13 that projects upwardly from the bottom of the bowl. At its bottom the shaft 14 is spaced slightly from the top of the drive shaft 19 and has a gear 39 anchored thereto which is driven indirectly from the drive pinion 35 through the medium of an idler shaft 41 having a pair of intermediate gears 42 and 43 thereon, both of which are constrained to rotate with the idler shaft and which respectively mesh with the drive pinion 35 and the driven gear 39. The idler shaft is journaled in cooperating bearings carried by bosses 45 and 46 on the bottom of the bowl and the bottom of the cup-like cap, respectively, and of course the idler shaft extends parallel to the axis of the drive shaft 19 and of the shaft 14 which carries the working elements. The drive pinion 35 is substantially smaller than the gear 42 which it drives, and the driven gear 39 is substantially larger than the gear 43 by which it is driven, so that the shaft 14 will rotate at a substantially lower speed than the drive shaft 19. However, the drive shaft and the shaft 14 by which the working elements are carried are coaxial with one another and with the bowl and power base, and consequently the unit is well balanced and smooth in operation.

The working elements may comprise either a macerator disc 50, normally used with a perforated basket 51 as shown in Figure 1, or a cutter 52, which may be either a slicer or a shredder, mounted as shown in Figure 4. Either of these types of working elements is detachably secured to the operating shaft 14 for rotation therewith by means of an adaptor hub 53 telescoped over and detachably held in position on the operating shaft by a nut 54.

More specifically, the upper end portion of the shaft 14 is reduced and threaded to receive the nut 54, and spaced below its threaded portion is an enlarged diameter portion 55 having a non-circular cross section to provide upwardly and downwardly facing shoulders 56 and 57, respectively. The downwardly facing shoulder 57 cooperates with the driven gear 39 to confine the shaft against axial displacement relative to the bushing 37, and an inverted cup-shaped washer 58 is pressed onto the shaft directly against the shoulder 57 to deflect food juices and liquors and prevent them from leaking down along the shaft 14 into the gear housing. A thrust washer is preferably interposed between the upper end of the bushing 37 at the top of the boss 13 and the underside of the cup-shaped washer 58. The hub member 53, in addition to carrying the working elements, also helps to guard against leakage of such materials into the gear housing.

The hub or adaptor 53 comprises an upright tubular central portion 60 having an integral radially projecting flange 61 at its bottom. The exterior of the tubular central portion of the hub has a non-circular cross-section, as best seen in Figure 2, while the bore therethrough has several different cross-sectional shapes along its length so that the hub may be axially installed on and removed from the shaft and when in place thereon will be constrained to rotate therewith. The lower portion of the bore of the hub is circular in cross-section and large enough in diameter to fit over and clear the boss 13 that projects upwardly from the bottom of the bowl. Directly above this the bore of the hub has a non-circular cross-section of a size and shape to receive the enlarged diameter non-circular portion 55 of the shaft, and above this the bore is of a diameter to slideably fit the circular cross-section portion of the shaft directly below the threaded upper end thereof. At its upper end the bore is again enlarged to define a wide, shallow upwardly opening well 62 at the top of the central portion of the hub. The hub, of course, is drivingly connected with the operating shaft through the engagement of the non-circular enlargement 55 of the latter in the non-circular portion of the hub bore, and the engagement of the upwardly facing shoulder 56 on the shaft portion 55 with the bottom of the large counterbore in the lower end of the hub defines the axial position of the hub on the operating shaft.

When the machine of this invention is used for macerating and juicing, the basket 51, which has a substantially cylindrical foraminous side wall 64, is set in place with its bottom resting on the flange portion 61 of the hub. The basket has a non-circular opening 65 in its bottom, the shape of which corresponds to the non-circular external cross-section of the tubular portion of the hub member, and radial ribs 66 in the bottom of the basket engage in radial grooves 67 in the upper face of the flange portion 61 of the hub to insure firm seating of the basket which holds it against tilting. The macerating disc 50 is set in place overlying the bottom of the basket, and it is constrained to rotate with the shaft 14 by reason of the fact that it has a central non-circular aperture 69, the size and shape of which correspond to the external cross-section of the tubular portion of the hub member. Numerous macerating teeth 70, somewhat like the teeth of a rasp, project upwardly from the face of the macerating disc and may be arranged in substantially radial rows. The rows of teeth, however, have been shown disposed substantially tangent to the hub. It will be seen that when the operating shaft 14 rotates, the hub and the basket and macerating disc carried thereby rotate in unison with the shaft, and juice containing foods presented to the macerating disc will be disintegrated thereby to free the juices from the pulp. The rotating basket effects a centrifuging action upon the pulp, further extracting juice therefrom, and it will be observed that the side wall of the basket is radially spaced from the side wall of the bowl, and the bottom of the basket is spaced a small distance above the bottom of the bowl to permit flow of juice from the basket to the bowl outlet. To encourage juice to flow out of the bowl as rapidly and as evenly as possible, the central portion of the bottom of the bowl is bulged upwardly, as at 72, and the bowl is provided with a flow directing spout 73 on its bottom, beneath its outlet.

The basket and macerating plate are prevented from tilting and rising on the hub by means of a tubular retainer 74 which removably fits over the central portion of the hub and is clamped down against the upper face of the macerating disc by the nut 54.

Obviously when juice is being extracted from fruit or vegetables, the container (i. e., the basket 51) in which the pulp is retained should be relatively deep so that maceration takes place at a low level in the bowl 10, near the bottom thereof; but when food materials are being sliced or shredded, the cut particles should be able to accumulate in substantial volume in the bowl, and should remain there undisturbed. Hence, when the machine of this invention is being used for slicing or shredding, the basket and macerating disc are removed and a cutting disc 52 is installed, at a level substantially above that occupied by the bottom of the basket and the macerating disc, near the top of the operating shaft 14 and in the upper portion of the bowl. The slicing or shredding disc rests on the upper end of the tubular central portion of the hub, as best seen in Figure 4, being clamped directly down onto the hub by means of the nut 54. A downwardly projecting coaxial pilot portion 78 on the nut engages in a central hole in the cutting element and extends down into the well 62 at the top of the hub member to hold the cutting element coaxial with the shaft, and (as best seen in Figure 5) radial ribs 80 in the cutter, on its underside, engage in notches 82 in the upper end of the hub to constrain the cutting element to rotate with the shaft. The tubular retainer 74 used with the basket and macerating element is of course not needed when a cutter is installed.

It will be observed that the shredded or sliced food material lies in the bowl undisturbed beneath the cutter, the position of the cutter near the top of the shaft 14 permitting a substantial volume of cut material to be accommodated in the bowl. It will also be observed that when using the machine for shredding or slicing, as when using it for juicing, the central tubular portion of the hub serves as a guard or protection around the operating shaft, preventing juices and food liquors from having access to the shaft, along which they might seep down into the gear compartment.

The cover 16 for the machine of this invention cooperates with the work performing elements in effecting the operation for which the machine is set up. When the machine is assembled with the basket and macerating disc, for juicing, as shown in Figure 1, the cover is fastened onto the bowl in what may be arbitrarily designated as an upright position, whereas the cover is installed in what may be termed an inverted position when the machine is used for slicing or shredding, as shown in Figures 4 and 5.

The cover may be formed as a single molded or cast unit, and has a circumferential flange 85, which, in either of its positions, engages over the rim of the bowl. Toggle fasteners 86 at diametrically opposite sides of the bowl have hooks 87 which readily releasably engage over lugs 88 on the cover to hold the latter in place. The inner surface of the bowl has a small depression or notch 89 adjacent each toggle fastener to receive the lugs which are lowermost in either position of the cover, and cooperates with them in centering the cover on the bowl. An opening 90 through the cover, at one side of its center and which may conveniently be made semi-circular in shape, provides for admission of pieces of food material to the work performing elements in the bowl.

The cover (see Figure 3) includes a cylindrical side wall 92 which, in what has been designated as the upright position of the cover, projects down into the perforated basket in the bowl to a level just above the upper face of the macerator disc therein, the wall being spaced radially inwardly from the cylindrical side wall of the basket. Extending substantially radially inwardly from this cylindrical wall is an upright wall 93, which terminates at an inner cylindrical wall element 94 that partially encircles the tubular central portion of the hub 53. Connected with the two cylindrical walls 92 and 94 and the upright wall 93 is a helical wall element 96 which spirals downwardly into the bowl through a half-turn in the direction of rotation of the shaft 14, terminating at its bottom in a short, flat segment 97 that lies in the plane of the lower edge of the cylindrical wall 92. This helical wall element defines a convergent throat whereby food pieces introduced into the bowl through the opening 90 in the cover are wedgingly urged downwardly in consequence of rotation of the macerator disc and are thus forced into disintegrating engagement with said disc. The horizontal wall segment 97 momentarily confines such pieces against the disc to insure thorough maceration and some degree of compression by which the juices will be thoroughly extracted.

In what has been referred to as the inverted position of the cover (see Figure 4), an axially projecting flange 98 around the edge of the opening 90 in the cover extends downwardly into the bowl, its lower edge being disposed in a plane parallel and closely adjacent to the cutting or shredding disc so that food pieces introduced into the aperture will be held by the flange against motion with the disc, to permit them to be sliced or shredded by the disc. To protect the fingers of the operator against contact with the cutting blade, and at the same time facilitate insertion of food pieces through the aperture, a removable feed chute 99 is provided, having a cross-sectional shape corresponding to that of the opening and a height substantially equal to that of the cylindrical side wall 92 on the cover. This chute removably fits into the aperture, bottoming on an upwardly facing shoulder defined by a ridge 100 extending inwardly from the bottom of the flange 98 around the opening, and the chute is steadied by its confinement between the cylindrical side wall and the upright wall segment 93.

From the foregoing description taken together with the accompanying drawings it will be apparent that this invention provides a versatile machine for macerating and juicing, slicing or shredding food materials, adapted for use with a conventional power base of a food comminuting machine having a removable mixing vessel. It will also be apparent that the machine of this invention is smooth in operation and well balanced because the shaft which carries the work performing elements is coaxial with the bowl and with the drive shaft; that the gear housing is well protected against the entry of food juices and other foreign matter when the machine is used; and that the machine may be readily disassembled for cleaning and has no intricately shaped parts in which inaccessible food particles may lodge to create an unsanitary condition.

What is claimed as our invention is:

1. A cover for the bowl of a food macerating machine having a macerator therein, comprising a disc-like wall, the outer edge portion of which forms a peripheral flange adapted to have cooperating interfitting relation with the rim of the bowl; a cylindrical wall attached to said disc-like wall and projecting perpendicularly from one face thereof substantially concentric to said flange and inwardly thereof, said cylindrical wall having a free edge; said disc-like wall having an eccentrically located opening therethrough inwardly of but near the cylindrical wall; a flange projecting from the other face of the disc-like wall, bounding and defining said eccentric opening; and a helical wall concentric with and attached to the inside of said cylindrical wall, one end of said helical wall being connected to the adjacent face of said disc-like wall at a location near the eccentric opening and the other end thereof being at the free edge of the cylindrical wall.

2. The cover of claim 1 further characterized by the fact that the peripheral flange formed by the edge portion of disc-like wall has opposite faces which are alike to adapt the flange for cooperating interfitting relation with the rim of the bowl regardless of which face of the cover is lowermost.

3. The cover of claim 1 wherein said helical wall extends radially in from the cylindrical wall a distance less than the full radius of said cylindrical wall; and further characterized by an arcuate wall spaced inwardly of and concentric to said cylindrical wall and joined to and extending from the inner edge of the helical wall to said disc-like wall.

4. The cover of claim 3 further characterized by a flat wall joined to said disc-like wall and connecting said cylindrical wall to one end of said arcuate wall, said flat wall being substantially perpendicular to the disc-like wall.

5. The cover of claim 4 further characterized by the fact that for part of its perimeter the edge of said eccentrically located opening is flat and coplanar with said flat wall.

6. The cover of claim 5 further characterized by the fact that for the remainder of its perimeter the edge of the eccentrically located opening is arcuate and substantially tangent to the cylindrical wall.

7. A food macerating machine comprising: a bowl having bottom and side walls; a boss integral with the bottom wall and extending upwardly into the bowl at the center thereof, said boss having a bore longitudinally therethrough; a cup-like member having bottom and side walls, said cup-like member being attached by its rim portion to the underside of the bottom wall of the bowl and coacting therewith to define a housing, the bottom wall of the cup-like member having a bore therethrough; a cutter driving shaft journalled in the bore which extends longitudinally through the boss, with its lower end projecting into the housing at the underside of the bowl and its upper end projecting above the top of the boss; a hub encircling the boss and having a portion thereof extending upwardly beyond the top of the boss; interengaging means on said upwardly extending portion of the hub and on the adjacent upper end of the cutter driving shaft providing a driving connection between the shaft and the hub; means on said hub to detachably and drivingly receive a rotatable cutter with the cutter located inside the bowl; a power input shaft journalled in the bore which extends through the bottom wall of the cup-like member, with its upper end inside said housing and its lower end external to the housing; means on the lower end of the power input shaft adapted to have driving engagement with an external power supply shaft; speed reduction gearing in the housing drivingly connecting the power input shaft with the cutter driving shaft; and a skirt carried by and extending down from the bottom wall of said cup-like member, said skirt encircling the lower end portion of the power input shaft in spaced concentric relation thereto, and being of a height such that no part of the power input shaft projects below the edge of the skirt, and said skirt being adapted to have interfitting engagement with an annular external supporting member.

References Cited in the file of this patent

UNITED STATES PATENTS

| | | |
|---|---|---|
| 864,109 | Schulte | Aug. 20, 1907 |
| 1,719,935 | Jones et al. | July 9, 1929 |
| 2,255,764 | Drachenberg | Sept. 16, 1941 |
| 2,257,747 | Jones | Oct. 7, 1941 |
| 2,325,779 | Kraber | Aug. 3, 1943 |
| 2,552,572 | Mikina | May 15, 1951 |
| 2,567,371 | Forkey et al. | Sept. 11, 1951 |